Feb. 7, 1933.   C. LUTTROPP   1,896,182
CALCULATING MACHINE
Filed Jan. 4, 1928   5 Sheets-Sheet 1

Feb. 7, 1933.  C. LUTTROPP  1,896,182
CALCULATING MACHINE
Filed Jan. 4, 1928  5 Sheets-Sheet 2

Inventor
Conrad Luttropp,
By
Atty

Feb. 7, 1933.  C. LUTTROPP  1,896,182
CALCULATING MACHINE
Filed Jan. 4, 1928    5 Sheets-Sheet 4

Inventor,
Conrad Luttropp,
By [signature]
Atty.

Feb. 7, 1933.   C. LUTTROPP   1,896,182
CALCULATING MACHINE
Filed Jan. 4, 1928   5 Sheets-Sheet 5

Patented Feb. 7, 1933

1,896,182

UNITED STATES PATENT OFFICE

CONRAD LUTTROPP, OF STOCKHOLM, SWEDEN, ASSIGNOR OF ONE-HALF TO ANDERS LINDAHL, OF STOCKHOLM, SWEDEN

CALCULATING MACHINE

Application filed January 4, 1928, Serial No. 244,465, and in Sweden November 2, 1927.

The present invention relates to calculating machines operated by a handle or crank shaft or equivalent means and in which one key only is provided for each individual digit, that is to say, calculating machines of the so called ten-key-operated type.

The principal object of the invention is to provide a calculating machine of the type above referred to which is positive and reliable in action, of a simple design, comprising a minimum of structural parts.

Further objects and advantages of my invention will be apparent from the following description considered in connection with the accompanying drawings which form a part of this specification.

In the following description, the expressions "fore" and "rear" as well as "forward" and "backward" refer to the key board as the fore part of the machine, and the expressions "right" and "left" refer to the calculating machine as seen from the front.

Figure 1:
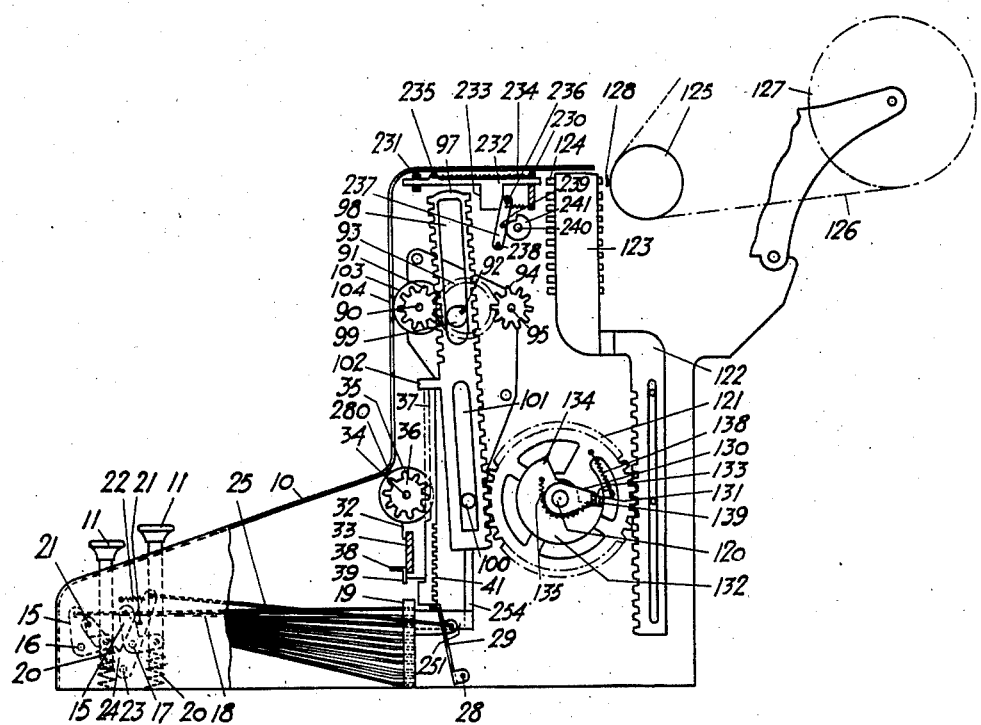
Figure 2:
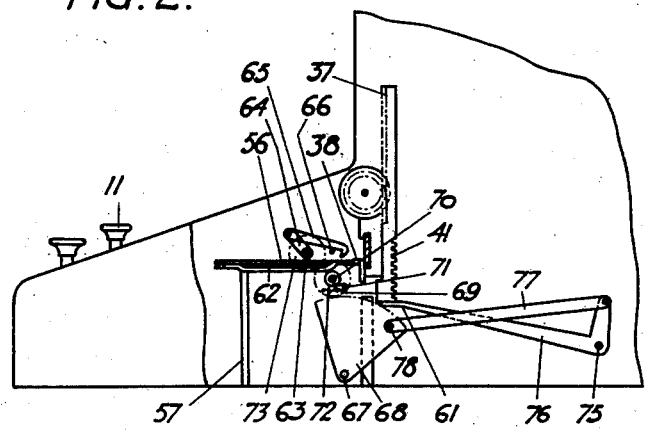
Figure 3:
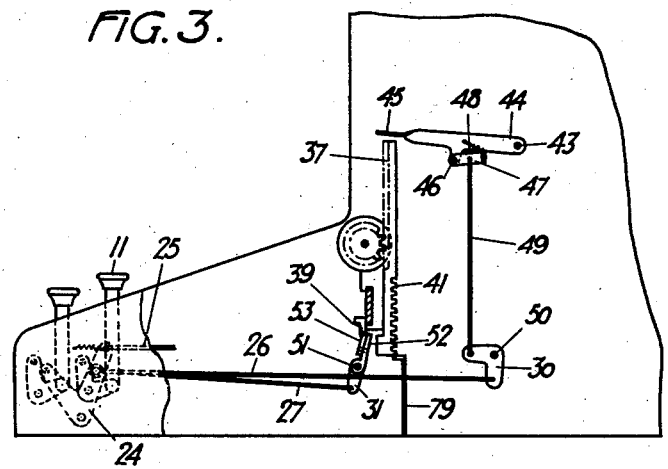
Figure 8:
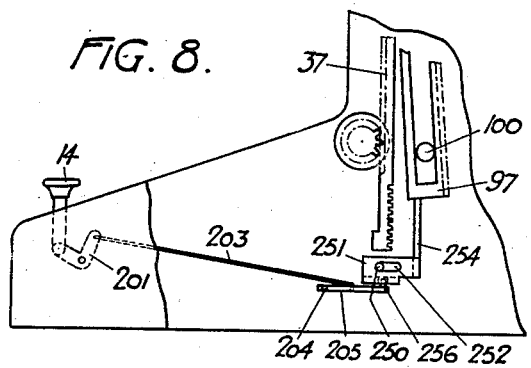
Figure 4:
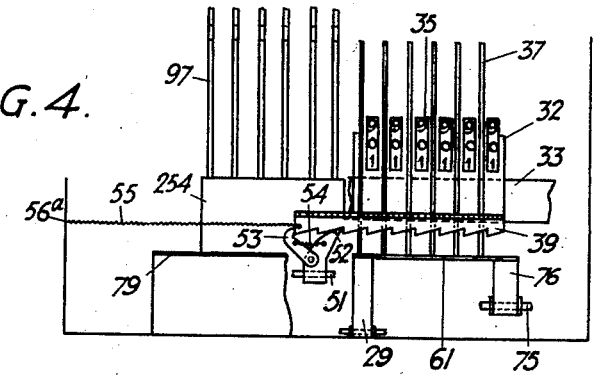
Figure 5:
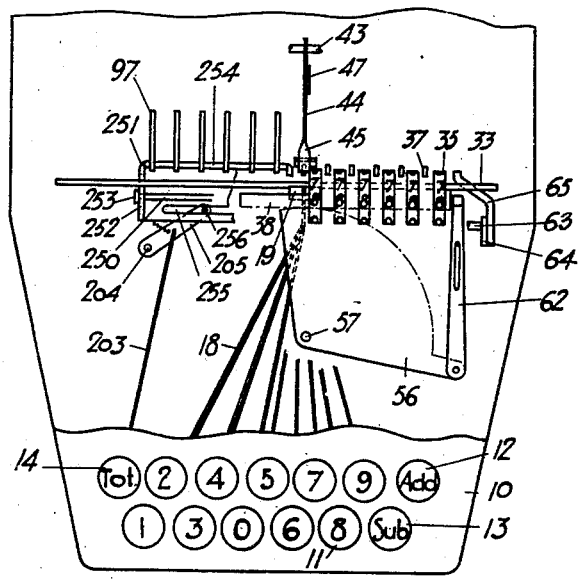
Figure 6:
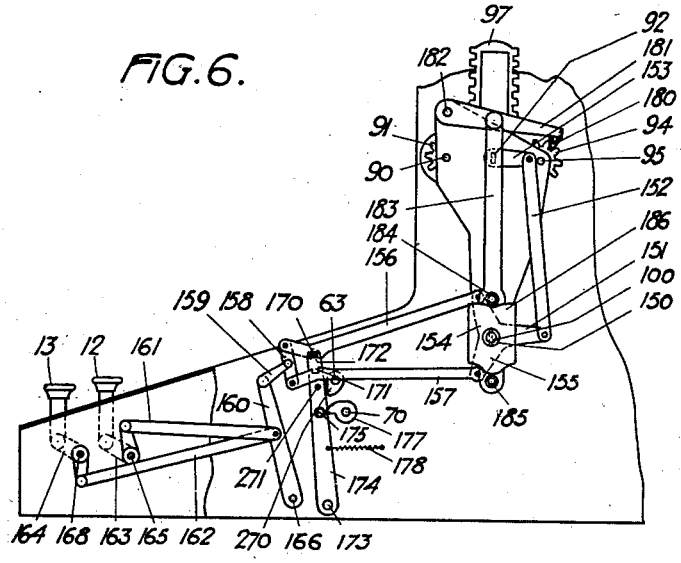
Figure 7:
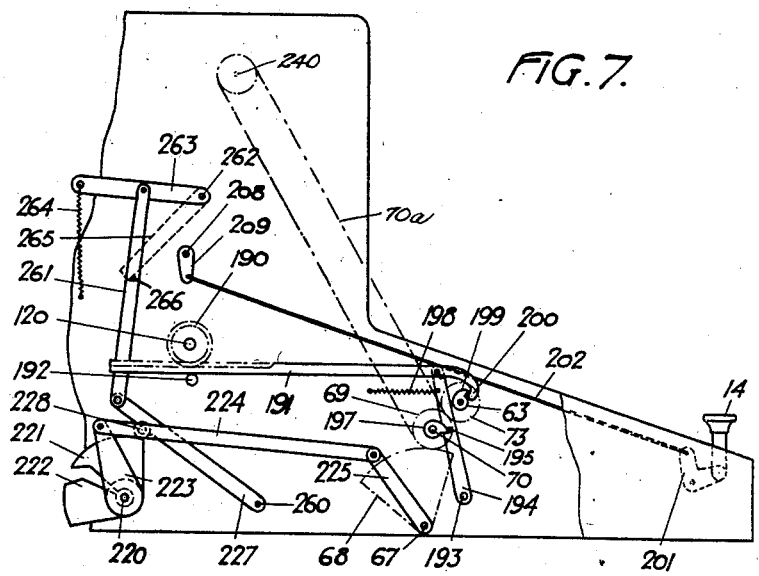
Figure 9:
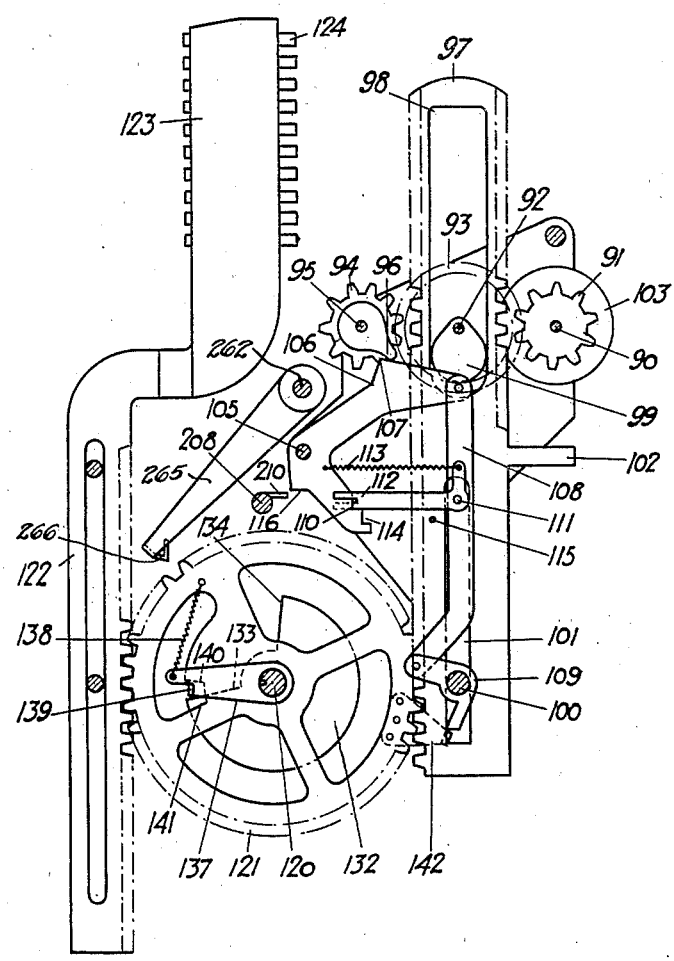

In the accompanying drawings, one embodiment of the invention is shown as an example. Fig. 1 is a side view, partially in cross-section, of the calculating machine as seen from the right hand side. Fig. 2 is a side view partially in cross-section, of the fore part of the machine likewise seen from the right hand side. Fig. 3 is a view similar to Fig. 2, illustrating the hammer mechanism of the selector. Fig. 4 is a front elevational view of the selector. Fig. 5 is a plan view, partially in cross-section, of the fore part of the machine. Fig. 6 is a side view, partially broken away, of the fore part of the machine as seen from the right hand side illustrating the addition and subtraction keys and associated parts. Fig. 7 is a side view, partially broken away, of the fore part of the machine as seen from the left hand side. Fig. 8 is a side view, partially broken away, of the fore part of the machine as seen from the right hand side illustrating the means for supporting the racks. Fig. 9 is a side elevational view on an enlarged scale showing the accumulator, the transferring means and the printing device.

In the following description the machine will first be described in detail and then a description will be given of the operation of the whole machine.

10 is a key board comprising ten digit keys 11 corresponding to the digits 0 to 9, respectively, two special keys 12 and 13 to set the machine for addition and subtraction, respectively, and one special key 14, the so called total key, by means of which the result of a counting operation may be obtained. The key board may also comprise certain other special keys for the operation of the machine, for instance a so called correcting key by means of which the number set up in the selector may be corrected digit by digit, a so called non-printing key by means of which, for instance, the hammer mechanism of the printing device may be set out of action and so on.

In the embodiment shown the ten digit keys 11 are arranged in two rows, (see especially Figs. 1 and 5) each of said keys comprising a rod guided in the key board 10 and provided at the top with a head carrying the respective digit. At the bottom, each rod is pivotally connected with a bell crank lever 15, said levers 15 being journalled in the machine frame on the shafts 16 and 17, respectively. Engaging the other end of each lever is a link 18 guided at its rear end in a guiding post 19. The various links 18 engage said post 19 one above the other, the link 18 connected to the key corresponding to the digit 0 lying uppermost and the other following in order, the link 18 connected to the key corresponding to the digit 9 being located at the bottom. Furthermore, each key 11 is connected at its lower end with a spring 20 bearing against the bottom of the machine frame and tending to hold the key in raised position.

Disposed in the path of movement of each of the two rows of bell crank levers 15 is a stop rod 21, said two rods 21 being connected with each other at their ends by means of bell crank levers 24 journalled in the machine frame as at 23. Engaging one arm of said bell-crank lever 24 are three links 25, 26 and 27. At its other end the link 25 engages a pawl 29 pivotally mounted in the machine frame at 28. The link 26 engages one arm of a bell crank lever 30 of the rack depressing mechanism of the selector, and the link 27 engages a lever 31 of the escapement mechanism of the selector.

The stopping means comprising the rods 21 acting as universal bars, one for each row of digit keys across the machine and the levers 24 are held by a spring 22 in such position as to keep the rods 21 in engagement with the key levers 15.

The selector of the calculating machine comprises a carriage 32 sliding on a guide rail 33 rigidly secured to the machine frame. Disposed in said carriage is a shaft 34 and loosely mounted on said shaft is a series of disks 35 provided with digits on their circumference. Each of said disks 35 carries a pinion 36 meshing with a vertical selector rack 37 slidably mounted in the carriage. In addition to the teeth engaging the pinion 36, each rack 37 is provided at its lower part with other teeth 41. Rigidly secured to the carriage 32 is a bar angle-shaped in cross section and having a portion 38 directed forwards and a portion 39 directed downwards. The portion 38 is provided with teeth meshing with a toothed sector 56 serving to reset the selector to starting position in the manner to be hereinafter described, whereas the downwardly directed portion 39 of the bar is provided with ratchet teeth co-operating with an escapement mechanism for stepwise movement of the selector in a manner to be hereinbelow described.

Above the racks 37 which usually drop by gravity when released, there is provided a lever 44 (see Fig. 3) pivotally mounted on the frame of the machine as at 43, the free end of said lever 44 ending in a rack depressing member 45 situated just above that rack 37 lying furthest to the left when the selector is in its starting position. Pivotally mounted on said lever 44, at 46, is another lever 47 connected with the lever 44 by a spring 48. Engaging the lever 47 at a point between the point of attachment of the spring 48 and the pivot 46 of the lever is a link 49, the other end of which engages the bell crank lever 30, above referred to, connected with the bell crank lever 24 by means of the link 26, said lever 30 being pivotally mounted on the machine frame at 50. This mechanism insures the depression of the racks as they are stepped under it, in case they should not fall of themselves.

The means for effecting stepwise movement of the selector is best shown in Figs. 3 and 4. The above mentioned lever 31 is journalled on a pin 51 secured to the machine frame. One arm of said lever 31 is connected to the bell crank lever 24 by means of the link 27, the other arm being formed as a pawl 52. Pivotally mounted on said pawl 52 is another pawl 53 connected to the pawl 52 by means of a spring 54, the arrangement being such that the movable pawl 53 normally engages the teeth on the downwardly directed portion 39 of the bar, whereas the fixed pawl 52 is out of engagement with said teeth. By means of a spring 55 the selector carriage 32 is connected with the machine frame as at 56ª, said spring tending to move the carriage to the left against the action of the ratchet mechanism 52, 53, 54. The strength of the spring 54 is such in relation to that of the spring 55 that the latter is capable of separating the pawls 52 and 53 from each other a distance corresponding to about two teeth of the bar 39.

The means for returning the selector carriage 32 to starting position is best shown in Figs. 2 and 5. Engaging the teeth on the forwardly directed part 38 of the bar secured to the carriage 32 is a toothed sector 56 journalled on the machine frame in any suitable manner, for instance, on the pin 57. Movably connected with said sector 56 is an arm 62 guided in the frame, the free end of which is bent somewhat upwards. Secured to one of the driving shafts 63 of the machine is an arm 64, and pivotally mounted at the free end of said arm 64 is a catching member 65 sliding on a pin 66 when the shaft 63 is rotated. The catching member or pawl 65 is so formed as to be brought into engagement with the arm 62 to move said arm forwards when the shaft 63 is rotated.

The calculating machine may be driven by an operating handle (not shown) secured to the general operating shaft 67. Secured to said shaft 67 is also a gear sector 68 (see for instance Fig. 2) meshing with a gear wheel 69 loosely journalled on a shaft 70 mounted in the machine frame, said gear wheel 69 being connected with said shaft 70 by means of a spring-actuated pawl 71 connected to the wheel 69 which is in mesh with a ratchet wheel 72 secured to the shaft 70, so that the shaft 70 will be rotated, when the operating handle is moved forwards, whereas said shaft will not be acted upon, when the handle is returned. The gear wheel 69 meshes with another gear wheel 73 mounted in a similar manner on the above mentioned driving shaft 63, the arrangement being such that said latter shaft 63 will be rotated, when the handle is returned, but will not be acted upon, when the handle is moved forwards.

In their starting position all of the racks 37 except that lying furthest to the left bear against a supporting plate 61 forming part of one arm of a bell crank lever 76 pivotally mounted on the machine frame at 75. The other arm of said lever 76 is connected with the driving gear sector 68 at 78 by means of a rod 77. The rack 37 lying furthest to the left bears against the above mentioned pawl 29. The end of the lever 76 is so formed that it can support all of the racks 37 except that lying furthest to the left, whereas the pawl 29 is only so wide that it can support one rack at a time. On the same level as the upper edge of the pawl 29 and extending in alignment with said edge is a horizontal guiding plate 79 forming a support for the racks 37 when they pass to the left out of engagement with the pawl 29.

The accumulator and the tens transferring means as well as the printing device are best shown in Figs. 1 and 9. Rotatably mounted on a shaft 90 secured in the machine frame are a series of gear wheels 91 in permanent engagement with another series of gear wheels 93 rotatably mounted on another shaft 92 secured to the machine frame, said last mentioned series of gear wheels 93 being in permanent mesh with a third series of gear wheels 94 rotatably mounted on a shaft 95 secured in the machine frame. The gear wheels 91 and 94 will hereinafter be referred to as accumulator wheels. The gear wheels 94 are each provided with a projection 96. Guided between each of the gear wheels 93 and guiding disks (not shown) secured to the shaft 92 are a series of racks 97 which I term counting racks provided with teeth on both sides. Each of said racks 97 is formed with an upper slot 98, and engaging said slot is an eccentric 99 secured to the shaft 92. By means of said eccentrics 99 the racks 97 may be swung on the shaft 100 secured in the machine frame to engage either the gear wheels 91 or the gear wheels 94 or out of engagement with both of these wheels as will be hereinafter described. The guide bar 100 passes through a lower slot 101 formed in each counting rack 97 so as to permit said racks to move up and down. Each of the wheels 91 and 94 is provided with ten teeth corresponding to the digits 0 to 9, respectively, and the wheels 91 and 94 are thick enough to permit the teeth thereon to simultaneously engage the intermediate wheels 93 and the counting racks 97. Each of the racks 97 is provided with a stop 102, said stops being located on the same level as the upper ends of the selector racks 37 when said latter racks occupy their starting position. Each of the wheels 91 is rigidly connected with a disk 103 having digits on its circumference corresponding to the digits 0 to 9, respectively, and visible through a window 104 provided in the machine frame. Disks 103 constitute a total indicator.

Rotatably mounted on a shaft 105 secured in the machine frame are a series of bell crank levers 106, one for each rack 97. Formed on the upper end of each lever 106 is a projection 107 co-operating with the projection 96 on the corresponding gear wheel 94. The one end of the one arm of said lever 106 is connected by a link 108 to the end of an angularly bent pawl 109 loosely journalled on the shaft 100. These pawls 109 serve to control the tens transfer operation in a manner to be described. At its other end the lever 106 is formed with a notch 110, and in engagement with said notch 110 with its one arm is a bell crank lever 112 pivoted to the link 108 as at 111. The other arm of said lever 112 is connected to the bell crank lever 106 by means of a spring 113. When the projection 96 of the accumulator wheel 94 upon the rotation of said wheel in clock-wise direction, as seen in Fig. 9, strikes the projection 107 on the lever 106, the locking lever 112 will be brought out of engagement with the notch 110 in the lever 106 and climb a shoulder 114 on said lever 106 thus locking said lever 106 in this position. At its end engaging the lever 106 the locking lever 112 is fork-shaped to embrace the lever 106. Each rack 97 carries a pin 115 adapted upon the upward movement of the rack 97 to again bring the locking lever 112 into engagement with the notch 110. The bell crank lever 106 is further provided with a projection 116 to lock the lever when a total is printed as will be hereinafter more fully described.

Secured in the machine frame is a shaft 120 and loosely mounted on said shaft are a series of gear wheels 121 which each engage a separate one of the racks 97. Each of said gear wheels 121 also engages a row of teeth on a type arm 122 guided in a slot in the rear plate of the frame and carrying a type head 123. Mounted in each type head 123 are ten types 124 each carrying one of the digits 0 to 9, said digits being arranged in the order stated reckoned from the top downwards. Each type comprises a little rod slidably mounted in the type head and carrying at its one end said digit and projecting at its other end a distance beyond said type head. Disposed in front of the type heads 123 (see Fig. 1) is a printing roller 125 adapted by means of a suitable mechanism (not shown) to be rotated step by step. Engaging said roller is a paper strip 126 from the paper supply roller 127. Arranged between the printing roller 125 and the type heads 123 is a colour ribbon 128 which is moved a step by any suitable means after each printing operation. The means for effecting the stepwise movement of the printing roller and of the colour ribbon do not form any part of the present invention and will, consequently, not be described in detail.

Each intermediate wheel 121 co-operates with a catch member 130 secured to the shaft 120 and provided with a lateral extension or stop 131. For each intermediate wheel 121 there is, furthermore, an individual limiting disk 132 loosely mounted on the shaft 120 and provided with a sector-shaped notch limited by the surfaces 133 and 134. Each catch member 130 is connected to its respective limiting disk 132 by means of a spring 135 tending to hold said disk 132 with the one limiting surface 133, of the notch in engagement with the stop 131. The center angle of the sector-shaped notch of the disk 132 corresponds to nine teeth of the toothed wheel 121 and, consequently, also to nine teeth of the rack 97 and of the type arm 122. Loosely mounted on the shaft 120 at the opposite side of each intermediate wheel 121 to said disk 132 is an arm 137 connected to the toothed wheel 121 by means of a spring 138. At its free end each of said arms 137 is provided with an abutment 139 extending through an opening in the wheel 121 and normally pressed by the spring 138 against one side of said opening as at 140. The abutment 139 serves as a limiting stop for the disk 132 in the rotation of the later in either direction, the disk striking said abutment 139 with either of the surfaces 133 or 134. Against the action of the spring 138 the arm 137 may be rotated by the limiting disk 132 through an angle corresponding to one tooth of the gear wheel 121, the rotation of said arm 137 being limited by the wheel itself to a movement of one tooth at 141. Departing from the position shown in Fig 9 the limiting disk 132 may be rotated by the catch member 130 and its stop 131 in counter-clockwise direction during the first nine steps, after which the limiting disk 132 strikes the abutment 139 with its surface 134, and then, as described above, through a further angle corresponding to one tooth against the action of the spring 138, whereas in opposite direction the limiting disk 132 may be rotated by the catch member 130 through an angle corresponding to nine teeth through the action of the spring 135. This arrangement will be more clearly described in connection with the description of the operation of the machine.

Each gear wheel 121 is further provided with a projection 142 extending beyond the periphery of the wheel in a direction at right angles to the tangent thereof. The gear wheels 121 with associated parts are disposed in a row on the shaft 120, so that the projection 142 of any gear wheel 121, when in normal position, will abut against the pawl 109 of the rack lying next to the right.

As stated before, the racks 97 may be caused to swing on shaft 100 by means of the eccentrics 99. This swinging movement of the racks 97 may be controlled from the key board 10, and the controlling means are best shown in Fig. 6 in which the machine is shown as set for addition with the addition key 12 depressed. Secured to the shaft 100 is a spider 150, having three arms 151, 154, 155. The arm 151 is connected by means of a link 152 to one end of an arm 153 secured to the shaft 92 mounted in the machine. The other arms 154, 155 of the spider 150 are each connected by means of a link 156 and 157, respectively, to a cross-piece 158, which is adapted to be operated by means of a toggle lever 159, 160 journalled in the machine frame as at 166 from the addition key 12 and the subtraction key 13 by means of links 161 and 162, respectively, engaging the one arm 160 of the toggle lever. As seen from Fig. 6, said keys 12 and 13 are each connected to the one arm of a bell crank lever 163 and 164, respectively, journalled on shafts 165 and 168, respectively, secured in the machine frame. The above mentioned links 161, 162 engage the other arms of said levers 163 and 164, respectively. In the embodiment shown, the bell crank levers 163 and 164 are so disposed that on depression of the addition key 12 the toggle will be shortened as shown in Fig. 6, whereas a depression of the subtraction key 13 will lengthen the toggle. Further it is clear, that a depression of one of the keys will cause elevation of the other, so that only one key can be depressed at a time.

Each of the links 156 and 157 is formed with a notch 170 and 171, respectively, cooperating with a pin 172 secured to one end of an arm 174 pivoted to the machine frame as at 173 and provided with a roller 175 cooperating with a cam 177 secured to the driving shaft 70 which is operated when the handle is moved forwards, said roller being held in permanent engagement with said cam 177 by means of a spring 178 having its one end secured to the arm 174 and its other end secured to the machine frame.

In the position shown in Fig. 6 the pin 172 on the arm 174 engages the notch 170 in the link 156. When the shaft 70 is rotated clock-wise, as seen in this figure, due to the operating handle being moved forwards the cam 177 first permits the arm 174 to be moved to the right, as seen in the same figure, to cause the pin 172 to move the link 156 to the right so as to turn the spider 150 in clock-wise direction, whereby the link 152 is drawn downwards so as to turn the shaft 92 clock-wise so that the racks 97 are swung counter-clockwise into engagement with the gear wheels 91 by the action of the eccentrics 99. In Fig. 9 which shows a view from the opposite side the directions of movement will, of course, be reversed.

If the subtraction key 13 is depressed causing, as mentioned above, an automatic elevation of the addition key 12, the toggle lever 159, 160 is lengthened, whereby the pin 172 is brought out of engagement with the notch 170 in the link 156 and into engagement with the notch 171 in the link 157. On operating the handle, the racks 97 will then, of course, be swung into engagement with the gear wheels 94 through the intermedium of the cam 177, pin 172, notch 171, link 157, spider 150, link 152, arm 153 and the eccentrics 99.

In order to permit tens transfer in the embodiment shown the racks 97 must be brought into engagement with the opposite series of gear wheels 94 on the return stroke of the operating handle. This is effected by a roller 271 mounted on the arm 174, said roller co-operating with a cam 270 secured to the driving shaft 63 operated during the return stroke of the handle.

In order to prevent an intentional or unintentional movement of the gear wheels 91 and 94, after they have once been set, a transverse locking beam 180 is provided above the gear wheels 94 loosely journalled on the shaft 95. Said locking beam 180 is swingably mounted on pins 182 by means of arms 181, and each of said arms 181 co-operates by means of a link 183 and rollers 184 and 185 rotatably mounted on said link with a cam 186 secured to the shaft 100. Said cam 186 is of such a shape that, when the shaft 100 is rotated by means of the spider 150 and either of the links 156 and 157, the locking beam 180 will be lifted out of engagement with the gear wheels 94 and again brought into engagement therewith as soon as the shaft 100 is returned to normal by means of the link system.

Secured to the one end of the shaft 120 (see Fig. 7) is a pinion 190 co-operating with a rack 191 displaceably mounted on a roller 192 rotatably mounted on the machine frame. At its one end said rack 191 is pivotally connected with the free end of an arm 194 rotatably mounted in the machine frame as at 193 and provided with a pin 195 co-operating with a cam 197 secured to the driving shaft 70. A spring 198 tends to hold the arm 194 with its pin 195 in engagement with the cam 197. As the operating handle is moved forwards, the shaft 70 will be rotated counter-clockwise, as seen in Fig. 7, as stated above, whereby the rack 191 is first moved backwards under the action of the spring 198 causing a rotation of the shaft 120 clockwise, as seen in the same figure, and then the rack 191 will be returned under the action of the cam 197 whereby the shaft 120 is returned into starting position.

For tens transfer the shaft 120 must, however, also be rotated in the opposite direction a small extent beyond its starting position. This is effected by a cam 199 secured to the driving shaft 63 which shaft is operated during the backward stroke of the handle, said cam 199 co-operating with an extension 200 of the rack 191 proper. When during the return stroke of the handle said shaft 63 is rotated counter-clockwise, as seen in Fig. 7, the rack 191 is first moved forwards and then backwards resulting in corresponding rotations of the shaft 120.

The total key 14 (see Figs. 7 and 8) is in the same manner as the other keys pivotally connected with the one arm of a bell crank lever 201 journalled in the machine frame. Engaging the other arm of said lever are two links 202 and 203, one 202, of which engaging at its other end the free end of an arm 209 secured to a shaft 208 journalled in the machine frame, whereas the other link, 203, engages an arm 205 journalled in the machine frame as at 204, said arm forming part of a device for releasing of a support for the racks 97 when a total result of a counting operation is to be printed, as will be more clearly described later on. Secured to the shaft 208 is a locking beam 210 (see Fig. 9) engaging, on depression of the total key 14, the projections 116 on the locking levers 106 for locking said levers for a purpose to be described.

The hammer mechanism for operating the types for printing the numbers set up as well as the total on the paper strip 126 is shown only diagrammatically, as said mechanism forms no part of the invention. According to Fig. 1 a hammer 232 is disposed in front of each type head, said hammer being movably mounted in the frame of the machine as at 230 and 231. Each hammer 232 carries a weight 233, and a spring 234 tends to move the hammer 232 towards the type head 123, said spring 234 being secured at its one end to the bearing 230 and at its other end to the hammer 232 as at 235. Disposed in front of all of said weights 233 is a retracting rod 236 carried by an arm 237 at either of its ends, the arms 237 being rotatably mounted in the machine frame as at 238 and carrying a roller 239 adapted to co-operate with a cam 241 secured to a shaft 240 journalled in the machine frame. Said shaft 240 is rotated from the driving shaft 70 operated during the forward stroke of the handle, for instance by means of sprocket wheels and chain 70a (see Fig. 7) and the cam 241 is of such a shape as to cause the roller 239 at the end of the forward stroke of the operating handle to drop into engagement with a notch in the cam 241, thereby allowing the arms 237 and the retracting rod 236 under the action of the spring 234 to be suddenly moved forwards to release the hammers 232 with their weights 233 so that the hammers 232 will strike the types 124, thereby effecting the printing of said types on the paper strip 126. The arrangement is preferably such that the hammers 232 are locked not only by the retracting rod 236, but also by another locking means, one for each individual hammer, adapted to release the hammer on actuation of the corresponding type arm 122, so that only those hammers which correspond to type arms 122 which have been acted upon will be brought into function on the weights 233 being released by the retracting rod 236.

As will be more fully described in the following in connection with the description of the operation of the calculating machine it is necessary that on setting up a given number in the selector as many racks reckoned from the right as there are digits in the number set up become free to move downwards, whereas the other racks must still be locked against such a movement. Further it is necessary that, when printing a total, all racks 97 are free to move downwards. Simple means to effect this are shown in Figs. 4, 5 and 8.

Secured to the selector carriage 32 is a shaft 250 and connected to said shaft is a frame 251 through which the shaft extends through lengthened horizontal openings 252 in the side plates of the frame 251. By means of a stop plate 253, secured to the shaft 250 at the side of the frame 251 opposite to that where the selector is located, the shaft 250 is connected with the frame 251 in such manner so as to permit the frame to move forwards and backwards in relation to the carriage 32 due to the lengthened openings 252 while maintaining the lateral relation to said carriage 32. The frame 251 is provided with a vertical plate 254 of such dimensions that in the starting position of the selector all racks 97 are normally supported by said supporting plate 254 (see Fig. 8). The bottom of the frame 251 is provided with a slot 255 and engaging said slot is a pin 256 on the arm 205 mentioned above, said arm 205 being pivotally mounted in the machine frame as at 204 and connected with the total key 14 by means of the link 203.

Further means are provided to effect an adjustment of the position of the gear wheels 121, so that the teeth of said wheels will lie in alignment with each other, said means being shown in Fig. 7. Arranged on the shaft 220 journalled in the machine frame is a cam sector comprising two parts 221, 222, one of which, 221, is secured to the shaft 220, whereas the other part 222 is loosely journalled on said shaft. Secured to said shaft 220 is further an arm 223 connected by means of a link 224 to the free end of another arm 225 secured to the driving shaft 67. The parts 221, 222 of the cam sector cooperate in such manner that in the normal position the part 222 loosely journalled on the shaft 220 bears at one side of said shaft against the part 221 secured to the shaft 220, in which position a free space is left between the two parts at the opposite side of the shaft 220 into which space a roller 228 mounted on a link 227 may drop during the forward stroke of the operating handle, after said roller 228 has slid upon the circumference of the part 221 secured to the shaft 220. In the continued forward movement of the handle the roller 228 will slide upon the circumference of the part 222 loosely mounted on the shaft 220. In the return stroke of the handle the loosely mounted part will be retained by the roller 228 due to friction against the latter, until no space remains between the parts 221 and 222 whereupon the roller 228 will slide up on the fixed part 221. At its one end the link 227 is pivoted to the machine frame by means of the pin 260 and at its other end the link 227 is connected by means of a link 261 to an arm 263 journalled in the machine frame by means of the shaft 262, the free end of said arm 263 being connected to the frame by means of a spring 264. Secured to the shaft 262 at each side of the machine is an arm 265, and these two arms are connected to each other at their free ends by means of a beam 266. As soon as the roller 228, during the forward stroke of the operating handle, drops into the space between the two parts 221, 222 of the cam sector, the beam will be moved into engagement with the wheels 121 under the action of the spring 264, thereby adjusting said wheels in such manner that the teeth of the various wheels will be in exact alignment.

The operation of the calculating machine above described is as follows, it being assumed that the number 8 should first be set up and printed and then the number 4 added thereto. It should first be observed that the addition key 12 is depressed. Then the key 11 on the board corresponding to the digit 8 is depressed. By the depression of the key the ninth link 18 counted from above is pushed out, so that this link 18 projects a distance beyond the guide post 19. Further the depression of the key causes the bell crank lever 15 connected therewith to press the stop rod 21 and, consequently, the bell crank lever 24 backwards. This results first in the pawl 29 being pushed backwards by the link 25 releasing the rack 37 lying furthest to the left so that this rack will be free to be moved downwards by gravity or the rack depressing mechanism, secondly in the lever 44 being turned downwards through the intermedium of the link 26, lever 30, link 49 and lever 47, so that the hammer 45 strikes the upper end of said rock 37, whereby this rack will be pressed down if it has not already dropped, until it abuts against the stop link 18 that has just been projected, and thirdly in the lever 31 being moved backwards by the link 27. This latter movement results in the movable pawl 53 being brought out of engagement with the ratchet teeth on the downwardly directed part 39 of the bar secured to the carriage 32, whereas the fixed pawl 52 will be caused to engage the tooth space lying right opposite said pawl. When then the key corresponding to the digit 8 is released the fixed pawl 52 will promptly be brought out of engagement and the movable pawl 53 is caused to engage the tooth space lying nearest to the right, as this pawl 53, when it was free, was drawn towards the fixed pawl 52 by means of the spring 54. As now, as already stated, the strength of the spring 54 is so adapted in relation to that of the spring 55 connecting the carriage 32 with the machine, that the spring 55 is capable of separating the pawls 52 and 53 a distance corresponding to about two teeth of the bar 39 against the action of the spring 54, the carriage 32 will be displaced one step to the left under the action of said spring 55, whereupon the movable pawl 53 will prevent further movement due to its engagement with the ratchet bar 39. As stated above, the rack 37 is pressed down by the hammer 45 into engagement with the stop link 18 which has just been projected. When the carriage 32 is moved one step to the left in the manner above described, said rack 37 slides along the fixed guide plate 79, said plate engaging with its upper edge the corresponding tooth space 41 in the rack 37. Further the second rack 37 reckoned from the left has slid from the support 61 on which it was previously bearing, onto the pawl 29, the top of which lies on the same level as support 61.

On account of the displacement of the selector carriage 32 one step to the left, the digit 8 set up will be visible through a window 280 provided in the machine frame (see Fig. 1). Consequently, the number 8 is now set up in the selector. Although in the example given numbers containing only one digit are chosen for the sake of simplicity, it is evident that the selector may be in the same manner set on numbers containing two or more digits, the number of the racks in the selector limiting the capacity of the machine.

Simultaneously with the displacement of the selector one step to the left, the frame 251, connected thereto by means of the shaft 250, has also been displaced correspondingly. Consequently, the rack 97 lying furthest to the right has been released from the supporting engagement of the plate 254, so that now the downward movement of said rack 97 is only limited by the selector rack 37 lying furthest to the left, which latter, after the displacement of the selector one step to the left, is directly below said rack 97 lying furthest to the right.

In order to transfer the number 8 to the accumulator wheels 91 and 94 the handle is operated. On the depression of the addition key 12, as shown in Fig. 6, the notch 170 in the link 156 has been brought into engagement with the pin 172 on the arm. When now the operating handle is moved forwards, the racks 97 will, consequently, be brought into engagement with the accumulator wheels 91 by means of the gear sector 68, shaft 70, cam 177 secured to said shaft, roller 175, arm 174, pin 172, notch 170, link 156, spider 150, link 152, arm 153, shaft 92 and the eccentrics 99 secured to said shaft. Simultaneously, the shaft 120 is rotated (see Fig. 7) by means of the pinion 190 secured to said shaft, rack 191, spring 198 and the cam 197 secured to the shaft 70, clockwise as seen in Fig. 9 and counter-clockwise, as seen in Fig. 1, the catch members 130 secured to said shaft 120 bringing with them the limiting disks 132 by means of the springs 135. Said limiting disks 132 tend to bring the gear wheels 121 with them due to the engagement of their surfaces 133 with the abutments 139 on the arms 137, and thereby to move the racks 97 downwards and the type arms 122 upwards. In the example given this is prevented with respect to all of the racks 97 except that one lying furthest to the right due to their engagement with the supporting plate 254. On the contrary, the rack 97 lying furthest to the right is free to move downwards and so it does, until its abutment 102 strikes the upper end of the rack 37 lying furthest to the left, that is to say, this rack 97 is moved downwards eight teeth, whereby, on the one hand, the corresponding digit wheel 91 is set on the digit 8 which will be visible through the window 104, and on the other hand the corresponding type arm 122 is lifted high enough to bring the type carrying the digit 8 right in front of the corresponding hammer 232. The other units composed of a rack 97, a gear wheel 121 and a type arm 122 as well as associated parts are only acted upon in such a respect that the respective catch members 130 are turned nine teeth. At the end of the forward stroke of the handle, the racks 97 are again brought out of engagement with the toothed wheels 91 into disengaged position by means of the cam 177 secured to the shaft 70 and the link system above referred to. At the end of the forward stroke of the operating handle the hammers of the hammer mechanism are released so that the number set up, 8, is printed on the paper strip 126. During the return stroke of the operating handle the shaft 120 is again rotated, this time in opposite directions, by means of the cam 199 secured to the shaft 63. In this special case this rotation of the shaft 120 is of no influence, but will be more fully explained in connection with the tens transfer on adding the number 4 to the number 8.

During the actuation of the operating handle the selector has also been returned into starting position. After setting up the number 8 in the selector, on the one hand the rack 37 lying furthest to the left is displaced downwards eight steps, while on the other hand the selector as a whole is displaced one step to the left. In order to zeroize the selector the rack 37 lying furthest to the left must be returned into starting position and also the selector as a whole must be displaced one step to the right. This is effected in the following manner. During the forward stroke of the operating handle (see Fig. 2) the bell crank lever 76 is turned downwards by means of the link 77 secured to the gear sector 68. This results in all the racks 37 which bear on the support 61 being lowered, that is to say, in the example referred to all of the racks 37 except that one lying furthest to the left, the arrangement being such that the support 61 is lowered to such a level as corresponds to the lower end of a rack 37 set on the digit 9. This movement of the racks 37 will not be visible through the window 280, as only the digit wheel 35 of a rack that has been operated will be visible through said window due to the displacement of the selector to the left step by step. Due to the displacement of the selector to the left the gear sector 56 meshing with the teeth 38 has been roated through a corresponding angle. When during the return stroke of the operating handle the shaft 63 (see Fig. 2) is rotated, the catch member 65 secured eccentrically to said shaft 63 will first slide backwards on the pin 66 and then be brought into engagement with the arm 62 connected to said gear sector 56, which arm during the continued rotation of the shaft 63 will be moved forwards causing a rotation of the gear sector 56 back to starting position whereby the selector as a whole is returned into starting position.

The rack 37 lying furthest to the left which has previously been supported by the engagement of the guide plate 79 with the teeth 41 on the rack, will, when the selector is displaced to the right, first slide from this guide plate 79 onto the pawl 29 and then down into engagement with the support 61. During the continued backward movement of the operating handle, all of the selector racks 37 are lifted by the lever 76 in alignment with the pawl 29, the rack lying furthest to the left then sliding onto said pawl 29. Now the selector is zeroized and ready for a following operation.

Assuming the key 11 of the key board corresponding to the digit 4 is now depressed, the rack 37 lying furthest to the left and the corresponding digit wheel 35 will be set on the number 4 in similar manner as above described with reference to the number 8, said digit 4 being visible through the window 280. When the operating handle is actuated the same functions take place, so that the accumulator wheel 91 lying furthest to the right will be rotated through an angle corresponding to four teeth and the number 4 will be printed on the paper strip 126.

In order that the accumulator shall show the sum of 8 and 4, which is 12, a tens transfer must have taken place, and this operation is as follows: After the first setting of the wheel 91 on the number 8, the gear wheel 94 in permanent engagement with said wheel 91 through gear wheel 93 is in such a position that the projection 96 of said wheel 94 still has to be stepped one tooth in the same direction as before to strike the projection 107 on the locking lever 106. On the rotation of the wheel 94 to set up the number 4 the projection 96 of the gear wheel lying furthest to the right will be brought into engagement with the projection 107 as soon as said wheel has gone through an angle corresponding to one tooth. In the continued rotation of the wheel 94 by means of the wheel 91, the projection 96 strikes the projection 107 on the locking lever 106 and thereby rotates the latter in clockwise direction as seen in Fig. 9, thereby turning the pawl 109 by means of the link 108 in a counter-clockwise direction. The lever 106 is locked in this position by the locking mechanism above described in as much as the locking lever 112 swingably mounted in the machine frame has left the notch 110 in the lever 106 and in its downward movement has moved onto the shoulder 115. Then the projection 96 is free to pass beyond the projection 107 so that the rotation of the gear wheel 94 through an angle corresponding to the remaining three teeth can be completed.

The gear wheels 121 when in normal position bear with their projections 142 against the pawl 109 of the rack unit lying next to the right, their continued rotation being thereby prevented. In the example given, the pawl 109 of the rack 97 lying furthest to the right, however, has been turned counter-clockwise, as seen in Fig. 9, when the projection 96 of the corresponding gear wheel 94 passed over the projection 107 of the locking lever 106. During the return stroke of the operating handle the racks 97 have been swung into engagement with the other series of accumulator wheels 94 by means of the cam 270 secured to the shaft 63 operated during said return stroke, roller 271, arm 174, pin 172, link 156, spider 150, link 152 arm 153, shaft 92 and the eccentrics 99 secured to said shaft. As stated above, the shaft 120 is rotated during the return stroke of the handle in a direction opposite to that during the forward stroke by means of the shaft 63 operated during the return stroke, cam 199, rack 191 and pinion 190. During this rotation the shaft 120 tends to bring the gear wheels 121 with it. However, this is prevented with respect to all those gear wheels 121 which are locked by the engagement of the pawl 109 with the projection 142, but on account of the turning of the pawl 109 of the rack lying furthest to the right the second rack 97 as counted from the right can be stepped one step by means of corresponding limiting disk 132 and catch member 130 against the action of the spring 138. Said gear wheel 121 cannot be stepped more than one tooth, because the projection 142 will then strike the center of the pawl 109. The rotation of the gear wheel one step is transferred to the corresponding accumulator wheel 94 and due to the permanent engagement of said wheel 94 with the accumulator wheel 91 through the intermedium of the gear wheel 93 also to the accumulator wheel 91, which, consequently, is rotated through an angle corresponding to one tooth. Then the tens transfer is, consequently, completed. Thus, in the accumulator 91, 94 the first gear wheel 91 shows 2, whereas the second wheel 91 shows 1, all reckoned from the right.

When it is desired to print the sum of the numbers 8 and 4 thus set, this is effected directly without any idle stroke merely by operating the handle, after the total key 14 has been depressed. When the total key is depressed, the arm 209 is turned counter-clockwise, as seen in Fig. 7, whereby the locking beam 210 is brought into engagement with the abutments 116 on the locking levers 106 so as to lock all these levers. Further the lever 205 is turned by the link 203 (see Fig. 8), so that the frame 251 with its vertical plate 254 supporting the racks 97 is brought out of engagement with said racks so as to permit downward movement of same.

In order to obtain a total, it is, however, also necessary to set the machine in such manner that on operating the handle the racks 97 are brought into engagement with the opposite series of accumulator wheels, that is to say, in addition, with the wheels 94. Preferably this is effected automatically on the depression of the total key, but for the sake of simplicity the means to effect this manœuvre has been omitted. It is, of course, also possible to set the machine in the manner desired by shifting the addition and subtraction keys. In the present case it is assumed that the subtraction key 13 is depressed.

When the operating handle is turned forwards, the racks 97 are moved into engagement with the gear wheels by means of the driving shaft 70, the cam 177 secured thereto, roller 175, arm 174, pin 172, link 157, spider 150, link 152, arm 153, shaft 92 and the eccentrics 99 secured to said shaft. At the same time the shaft 120 is rotated in the manner described above and therewith also the catch members 130 and the limiting disks 132 and in this movement the disks 132 due to engagement of their surfaces 133 with the abutment 139 tend to bring the gear wheels 121 with them. In the example given this tendency is suppressed with respect of all of the wheels 121 except the two wheels furthest to the right in as much as the projections 96 of the corresponding wheels 94 already bear against the projections 107 of those locking levers 106 locked by the locking beam 210. In the first two units as counted from the right the movement is transmitted from the gear wheels 121 over the racks 97 to the wheels 94. The movement is continued, until the projection 96 of the gear wheels 94 furthest to the right strikes the projection 107 of the respective locking levers 106, that is to say, the first rack 97 is moved downwards a distance corresponding to two teeth, because the first gear wheel 94 was set on the digit 2 and the rotation, as above stated, takes place in the opposite direction to that above referred to, whereas the second rack 97 as counted from the right is moved downwards a distance corresponding to one tooth, because the respective gear wheel 94 was set on 1. The remaining racks 97 will not be actuated, and the corresponding limiting disks 132 will be turned idle against the action of the springs 135. At the same time the first two type heads 123 as counted from the right are set correspondingly, that is to say the first type head is set on 2 and the second on 1. The number 12 is then printed in the manner above set forth and the parts are returned to normal when the shaft 120 is returned during the latter part of the forward stroke of the operating handle. In this restoration the springs 135 are first released through the intermedium of the rack 191 and the pinion 190, and then the disks 132 associated with the two gear wheels 121 operated are returned to normal during the continued rotation of the shaft 120 and finally all parts are restored to normal position.

What I claim is:

1. In a ten key calculating machine, a set of stops, a key for projecting each stop, a series of vertically disposed gravity-operated racks, key operated depressing means for said racks, means for supporting all the racks in zero position except an unset rack at the left, a pawl supporting the unset rack at the left in its zero position, a carriage in which the racks are mounted, means actuated upon depression of a key to remove the pawl from the rack at the left and allow this rack to drop onto a stop projected by a key, said pawl re-engaging the rack in its set position, stepping mechanism for the carriage actuated from the keys, means for holding the racks in their set position as they are stepped beyond the pawl, and accumulator mechanism on which the digits selected by the keys are transferred by the racks after the number has been set up on the racks.

2. In a ten key calculating machine, a set of vertically alined stops, a key for projecting each stop, a series of gravity-operated racks, key operated depressing means for said racks, means for supporting all the racks in zero position except an unset rack at the left, a pawl supporting the unset rack at the left in its zero position, a carriage in which the racks are mounted, means actuated upon depression of a key to remove the pawl from the rack at the left and allow this rack to drop onto a stop projected by a key, said pawl re-engaging the rack in its set position, a stepping mechanism for the carriage actuated from the keys, means for holding the racks in their set position as they are stepped beyond the pawl, and accumulator mechanism on which the digits selected by the keys are transferred by the racks after the number has been set up on the racks.

3. In a ten key calculating machine, a set of stops, a key for projecting each stop, a series of gravity-operated racks, key operated depressing means for said racks, means for supporting all the racks in zero position except an unset rack at the left, a pawl supporting the unset rack at the left in its zero position, means operable on the pawl supported rack to insure the engagement of the rack and stop, a carriage in which the racks are mounted, means actuated upon depression of a key to remove the pawl from the rack at the left and allow this rack to drop onto a stop projected by a key, said pawl re-engaging the rack in its set position, stepping mechanism for the carriage actuated from the keys, means for holding the racks in their set position as they are stepped beyond the pawl, and accumulator mechanism on which the digits selected by the keys are transferred by the racks after the number has been set up on the racks.

4. In a ten key calculating machine, a set of stops, a key for projecting each stop, a series of gravity operated racks, key operated depressing means for said racks, means for supporting all the racks in zero position except the unset rack in the left of the series of racks, a pawl to support said unset rack at the left, a carriage in which the racks are mounted, means actuated upon the depression of a key to remove the pawl and allow the rack to drop onto the projected stop and re-engage the rack in its set position, stepping mechanism for the carriage actuated from the keys, means for holding the racks in their set position as they are stepped beyond the pawl, and accumulator mechanism including accumulator racks each having a stop, and devices to positively move the accumulator racks into engagement with the first racks after the latter have been stepped under said stops.

5. In a ten key calculating machine, a stationary vertical set of stops, a key for projecting each stop, a series of gravity operated racks, key operated depressing means for said racks, means for supporting all the racks in zero position except an unset rack at the left, a pawl to hold said rack at the left in its zero position, a carriage in which the racks are mounted, means operated by a key to withdraw said pawl and permit its rack to engage a projected stop and re-engage the rack, stepping mechanism for the carriage actuated from the keys, means for holding the racks in their stepped position as they are stepped beyond said pawl, a supporting plate on the carriage to the left of said pawl, and accumulator mechanism including vertically movable accumulator racks normally held inoperative by said plate, stops on said accumulator racks, said accumulator racks successively released as the carriage is stepped, devices to positively operate all the released accumulator racks after all the set up racks of said carriage have been moved under said stops to cause the stops to engage the carriage racks and transfer the set up number to the accumulator.

6. In a ten key calculating machine, a casing having openings therein, a set of stops, a key for projecting each stop, a series of vertically movable racks each having ten teeth, key operated depressing means for said racks, indicator means behind said openings movable by said racks to show the number set up by the racks, means for supporting all the racks in zero position except an unset rack at the left of said series, a pawl supporting the unset rack at the left in its zero position, a carriage in which the racks are mounted, means actuated upon depression of a key to remove the pawl from the rack it supports and allow it to drop onto a stop projected by a key and re-engage the rack in its set position, stepping mechanism for the carriage actuated from the racks, means to hold the racks in set position as they are stepped past said pawl, and an accumulator mechanism into which the digits selected by the racks through the keys are transferred after all the digits of the number have been set up on the racks.

7. A calculating machine comprising a plurality of substantially vertically disposed, vertically movable and horizontally pivoted counting racks, selector mechanism comprising a plurality of vertically disposed selector racks constituting abutments for limiting movement of the counting racks, stops constituting abutments for limiting movement of the selector racks and keys for operating the stops.

8. A calculating machine comprising a plurality of substantially vertically disposed, vertically movable and horizontally pivoted counting racks, selector mechanism comprising a plurality of vertically disposed selector racks constituting abutments for limiting downward movement of the counting racks, stops constituting abutments for limiting downward movement of the selector racks and keys for operating the stops.

9. A calculating machine comprising a plurality of substantially vertically disposed, vertically movable and horizontally pivoted counting racks, selector mechanism comprising a plurality of vertically disposed selector racks constituting abutments for limiting movement of the counting racks, stops constituting abutments for limiting movement of the selector racks, keys for operating the stops and rotatable means for moving the counting racks into contact with the selector racks.

10. A calculating machine comprising a plurality of substantially vertically disposed, vertically movable and horizontally pivoted counting racks, selector mechanism comprising a plurality of vertically disposed selector racks constituting abutments for limiting movement of the counting racks, stops constituting abutments for limiting movement of the selector racks, keys for operating the stops and means for moving the counting racks into contact with the selector racks including a yieldable connection with each of the counting racks individually.

11. A calculating machine comprising a plurality of substantially vertically disposed, vertically movable and horizontally pivoted counting racks, selector mechanism comprising a plurality of vertically disposed selector racks constituting abutments for limiting movement of the counting racks, stops constituting abutments for limiting movement of the selector racks, keys for operating the stops, gears meshing with said counting racks for moving said counting racks into contact with said selector racks, a rotatable operating shaft and yieldable connections between said operating shaft and said gears individually 12. A calculating machine comprising a row of substantially vertically disposed, vertically movable and horizontally pivoted counting racks, accumulator mechanism comprising a plurality of rows of wheels, wheels of different rows corresponding to each rack and one to each side of each rack, means to interconnect corresponding wheels for the respective racks to rotate together, the pivoting of said racks causing engagement with the wheels on either side, selector mechanism comprising a plurality of vertically disposed selector racks constituting abutments for limiting downward movement of the counting racks, stops constituting abutments for limiting downward movement of the selector racks and keys for operating the stops.

13. A calculating machine comprising a row of substantially vertically disposed, vertically movable and horizontally pivoted counting racks, accumulator mechanism comprising a plurality of rows of wheels, wheels of different rows corresponding to each rack and one to each side of each rack, means to interconnect corresponding wheels for the respective racks to rotate together, the pivoting of said racks, causing engagement with the wheels on either side, selector mechanism comprising a plurality of vertically disposed selector racks constituting abutments for limiting movement of the counting racks, stops constituting abutments for limiting movement of the selector racks, keys for operating the stops and rotatable means for moving the counting racks into contact with the selector racks.

14. A calculating machine comprising a row of substantially vertically disposed, vertically movable and horizontally pivoted counting racks, accumulator mechanism comprising a plurality of rows of wheels, wheels of different rows corresponding to each rack and one to each side of each rack, means to interconnect corresponding wheels for the respective racks to rotate together, the pivoting of said racks causing engagement with the wheels on either side, selector mechanism comprising a plurality of vertically disposed selector racks constituting abutments for limiting movement of the counting racks, stops constituting abutments for limiting movement of the selector racks, keys for operating the stops and means for moving the counting racks into contact with the selector racks including a yieldable connection with each of the racks individually.

15. A calculating machine comprising a row of substantially vertically disposed, vertically movable and horizontally pivoted counting racks, accumulator mechanism comprising a plurality of rows of wheels, wheels of different rows corresponding to each rack and one to each side of each rack, means to interconnect corresponding wheels for the respective racks to rotate together, the pivoting of said racks causing engagement with the wheels on either side, selector mechanism comprising a plurality of vertically disposed selector racks constituting abutments for limiting movement of the counting racks, stops constituting abutments for limiting movement of the selector racks, keys for operating the stops, gears meshing with said counting racks for moving said counting racks into contact with said selector racks, a rotatable operating shaft and yieldable connections between said operating shaft and said gears individually.

16. A calculating machine comprising a row of longitudinally movable and pivoted counting racks, accumulator mechanism comprising a plurality of rows of wheels, wheels of different rows corresponding to each rack and one to each side of each rack, means to interconnect corresponding wheels for the respective racks to rotate together, the pivoting of said racks causing engagement with the wheels on either side, selector mechanism comprising a plurality of selector racks constituting means for limiting movement of the counting racks, stops constituting means for limiting movement of the selector racks and keys for operating the stops.

17. A calculating machine comprising a row of longitudinally movable and pivoted counting racks, accumulator mechanism comprising a plurality of rows of wheels, wheels of different rows corresponding to each rack and one to each side of each rack, means to interconnect corresponding wheels for the respective racks to rotate together, the pivoting of said racks causing engagement with the wheels on either side, selector mechanism comprising a plurality of selector racks constituting abutments for limiting downward movement of the counting racks, stops constituting abutments for limiting downward movement of the selector racks and keys for operating the stops.

18. A calculating machine comprising a row of longitudinally movable and pivoted counting racks, accumulator mechanism comprising a plurality of rows of wheels, wheels of different rows corresponding to each rack and one to each side of each rack, means to interconnect corresponding wheels for the respective racks to rotate together, the pivoting of said racks causing engagement with the wheels on either side, selector mechanism comprising a plurality of selector racks constituting means for limiting movement of the counting racks, stops constituting means for limiting movement of the selector racks, keys for operating the stops and means for moving the counting racks into contact with the selector racks including a yieldable connection with each of the counting racks individually.

19. A calculating machine comprising a row of longitudinally movable and pivoted counting racks, accumulator mechanism comprising a plurality of rows of wheels, wheels of different rows corresponding to each rack and one to each side of each rack, means to interconnect corresponding wheels for the respective racks to rotate together, the pivoting of said racks causing engagement with the wheels on either side, selector mechanism comprising a plurality of selector racks constituting means for limiting movement of the counting racks, stops constituting means for limiting movement of the selector racks, keys for operating the stops, gears meshing with said counting racks for moving said counting racks into contact with said selector racks, a rotatable operating shaft and yieldable connections between said operating shaft and said gears individually.

20. A calculating machine comprising a row of longitudinally movable and pivoted counting racks, accumulator mechanism comprising a plurality of rows of wheels, wheels of different rows corresponding to each rack and one to each side of each rack, means to interconnect corresponding wheels for the respective racks to rotate together, the pivoting of said racks causing engagement with the wheels on either side, selector mechanism comprising a plurality of selector racks constituting means for limiting movement of the counting racks, stops constituting means for limiting movement of the selector racks, keys for operating the stops, means to engage the counting racks with the wheels on one side and subsequently with the wheels on the other side during a calculating cycle and means to reverse the order of engagement of the counting racks with the wheels.

21. A calculating machine comprising a row of substantially vertically disposed, vertically movable and horizontally pivoted counting racks, a row of vertically disposed type racks, a row of gears meshing with the counting racks and the type racks and rotatable to move the counting racks and type racks together, selector mechanism comprising a movable carriage, a row of vertically disposed selector racks mounting in said carriage and constituting abutments for limiting movement of the counting racks, stops constituting abutments for limiting movement of the selector racks and keys for operating the stops.

22. A calculating machine comprising a row of substantially vertically disposed, vertically movable and horizontally pivoted counting racks, a row of vertically disposed type racks, a row of gears meshing with the counting racks and the type racks and rotatable to move the counting racks and type racks together, selector mechanism comprising a movable carriage, a row of vertically disposed selector racks mounted in said carriage and constituting abutments for limiting movement of the counting racks, stops constituting abutments for limiting movement of the selector racks, keys for operating the stops, an operating shaft for rotating said gears to move the counting racks into contact with the selector racks and individual yieldable connections between the operating shaft and the gears.

23. A calculating machine comprising a row of substantially vertically disposed, vertically movable and horizontally pivoted counting racks, a row of vertically disposed type racks, a row of gears meshing with the counting racks and the type racks and rotatable to move the counting racks and type racks together, selector mechanism comprising a movable carriage, a row of selector racks mounted in said carriage and constituting abutments for limiting movement of the counting racks, stops constituting abutments for limiting movement of the selector racks, keys for operating the stops, means to rotate the gears in one direction for the transfer of items and means to rotate the gears in the other direction for transfer of tens.

24. A calculating machine comprising a row of substantially vertically disposed, vertically movable and horizontally pivoted counting racks, a row of vertically disposed type racks, a row of gears meshing with the counting racks and the type racks and rotatable to move the counting racks and type racks together, selector mechanism comprising a movable carriage, a row of selector racks mounted in said carriage and constituting abutments for limiting movement of the counting racks, stops constituting abutments for limiting movement of the selector racks, keys for operating the stops, means to rotate the gears in one direction for the transfer of items, means to rotate the gears in the other direction for the transfer of tens, and individual yieldable operating connections for each of the gears.

25. A calculating machine comprising a row of substantially vertically disposed, vertically movable and horizontally pivoted counting racks, accumulator mechanism comprising a row of wheels to each side of the racks interconnected to rotate together, means to rock the racks into engagement with the wheels on either side, indicator wheels connected to the wheels of one of said rows, selector mechanism comprising a plurality of vertically disposed selector racks constituting abutments for limiting movement of the counting racks, indicator wheels connected with said selector racks, stops constituting abutments for limiting movement of the selector racks and keys for operating the stops.

26. A calculating machine comprising a row of substantially vertically disposed, vertically movable and horizontally pivoted counting racks, accumulator mechanism comprising a row of wheels to each side of the racks interconnected to rotate together, means to rock the racks into engagement with the wheels on either side, indicator wheels connected to the wheels of one of said rows, selector mechanism comprising a plurality of vertically disposed selector racks constituting abutments for limiting downward movement of the counting racks, indicator wheels connected with said selector racks, stops constituting abutments for limiting downward movement of the selector racks and keys for operating the stops.

27. A calculating machine comprising a row of substantially vertically diposed, vertically movable and horizontally pivoted counting racks, accumulator mechanism comprising a row of wheels to each side of the racks interconnected to rotate together, means to pivot the racks into engagement with the wheels on either side, indicator wheels connected to the wheels of one of said rows, selector mechanism comprising a plurality of vertically disposed selector racks constituting abutments for limiting movement of the counting racks, indicator wheels connected with said selector racks, stops constituting abutments for limiting movement of the selector racks, keys for operating the stops and rotatable means for moving the counting racks into contact with the selector racks.

28. A calculating machine comprising a row of substantially vertically disposed, vertically movable and horizontally pivoted counting racks, accumulator mechanism comprising a row of wheels to each side of the racks interconnected to rotate together means, to pivot the racks into engagement with the wheels on either side, indicator wheels connected to the wheels of one of said rows, selector mechanism comprising a plurality of vertically disposed selector racks constituting abutments for limiting movement of the counting racks, indicator wheels connected with said selector racks, stops constituting abutments for limiting movement of the selector racks, keys for operating the stops and means for moving the counting racks into contact with the selector racks including a yieldable connection with each of the counting racks individually.

In testimony whereof I have signed my name.

CONRAD LUTTROPP.